(12) United States Patent
Larkin

(10) Patent No.: US 7,878,462 B1
(45) Date of Patent: Feb. 1, 2011

(54) CABLE CONSTRAINING DEVICE FOR REDUCED CABLE WEAR

(76) Inventor: Kevin B. Larkin, 1140 Porque La., Pebble Beach, CA (US) 93953

( * ) Notice: Subject to any disclaimer, the term of this patent is extended or adjusted under 35 U.S.C. 154(b) by 242 days.

(21) Appl. No.: 12/131,096

(22) Filed: Jun. 1, 2008

(51) Int. Cl.
F16L 3/16 (2006.01)
(52) U.S. Cl. .................. 248/55; 248/636; 248/74.2
(58) Field of Classification Search ........... 248/609, 248/635, 49, 55, 74.2, 74.3, 636
See application file for complete search history.

(56) References Cited

U.S. PATENT DOCUMENTS

| | | | | |
|---|---|---|---|---|
| 1,315,225 | A * | 9/1919 | Hughes | 248/68.1 |
| 2,399,899 | A * | 5/1946 | Tinnerman | 174/40 CC |
| 2,474,920 | A * | 7/1949 | Stearns | 248/49 |
| 2,891,749 | A * | 6/1959 | Heverly | 248/49 |
| 3,848,839 | A * | 11/1974 | Tillman | 248/74.2 |
| 4,705,244 | A * | 11/1987 | Saotome et al. | 248/68.1 |
| 4,896,465 | A * | 1/1990 | Rhodes et al. | 451/523 |
| 4,971,271 | A * | 11/1990 | Sularz | 248/68.1 |
| 5,257,768 | A * | 11/1993 | Juenemann et al. | 248/604 |
| 5,743,302 | A * | 4/1998 | McNeely | 138/113 |
| 5,828,005 | A * | 10/1998 | Huynh-Ba et al. | 174/92 |
| 5,947,158 | A * | 9/1999 | Gross et al. | 138/149 |
| 6,050,964 | A * | 4/2000 | Yates | 602/5 |
| 6,198,042 | B1 * | 3/2001 | Huston | 174/40 R |
| 6,241,199 | B1 * | 6/2001 | Ismert | 248/56 |
| 6,421,487 | B1 * | 7/2002 | Hutton et al. | 385/114 |
| 6,488,317 | B1 | 12/2002 | Daoud | |
| 6,491,279 | B1 * | 12/2002 | Iwano | 248/635 |
| 6,604,715 | B2 * | 8/2003 | Howe | 248/62 |
| 6,732,982 | B1 * | 5/2004 | Messinger | 248/74.1 |
| 6,864,427 | B2 | 3/2005 | Radelet | |
| 6,875,496 | B2 * | 4/2005 | Roosen et al. | 428/194 |
| 6,960,380 | B2 * | 11/2005 | Buekers et al. | 428/40.1 |
| 7,202,418 | B2 * | 4/2007 | Glew | 174/113 C |
| 7,284,730 | B2 * | 10/2007 | Walsh et al. | 248/74.3 |
| 7,534,965 | B1 * | 5/2009 | Thompson | 174/153 G |
| 2003/0218103 | A1 * | 11/2003 | Connors | 248/49 |
| 2005/0067548 | A1 * | 3/2005 | Inoue | 248/635 |
| 2007/0120022 | A1 * | 5/2007 | Trotter et al. | 248/49 |
| 2008/0254255 | A1 * | 10/2008 | Kao | 428/141 |

* cited by examiner

Primary Examiner—J. Allen Shriver, II
Assistant Examiner—Bradley H Duckworth
(74) Attorney, Agent, or Firm—Johannes Schneeberger

(57) ABSTRACT

A cable constraining device features a flexible cable contact sheet that is inward attached to a cable constraining contour of a holding structure. The holding structure is configured for substantially encompassing a cable circumference while in constraining configuration. A cavity between the holding structure and the cable contact sheet is filled with a gel that provides a vibration dampening soft contact of the cable contact sheet with the cable insulation. The cushioning gel absorbs micro movement of the cable transferred onto the cable contact sheet such that wearing effects due to frictional sliding and vibration of the cable at its constraining location is substantially reduced. The holding structure may be of rubber like material that is formed on its outside like a well known grommet. An outer rigid clamping structure may be additionally employed in case of a circumferentially tight able configuration.

17 Claims, 6 Drawing Sheets

CABLE CONSTRAINING DEVICE FOR REDUCED CABLE WEAR

FIELD OF INVENTION

The present invention relates to devices for constraining cables. In particular, the present invention relates to cable constraining devices utilizing an encapsulated gel cushion for resiliently absorbing vibrations of the constrained cable.

BACKGROUND OF INVENTION

In engine driven vessels such as airplanes, helicopters, and the like, cables are exposed to tremendous vibrations that significantly contribute the cables' wear particularly at their attachment locations. Cable wear in turn is a substantial factor in reducing the overall operational safety of such engine driven vessels. This is of particularly concern for aeronautic vessels that tend to stay in service for several decades. Cable wear is also difficult to monitor, since the cables are commonly stored away, which makes their attachment locations inaccessible for inspection. Therefore, there exists a need for a cable constraining device that provides reduced cable wear. The present invention addresses this need.

Conventional cable constraining devices such as grommets and cable clips commonly employ a rubber like material encompassing the cable's insulation at the attachment location of that cable. The rubber is commonly employed to protect the cable insulation against surrounding sharp edges and/or hard materials that would damage the cable insulation in a short time. Nevertheless, the rubber itself likely rubs against the cable insulation causing both to wear, which eventually results in exposure of conductive cable core. Therefore, there exists a need for a cable constraining device that substantially avoids rubbing and eventual micro sliding between the cable insulation and the contacting portion of the cable constraining device. The present invention addresses also this need.

SUMMARY

A cable constraining device features a flexible cable contact sheet that is inward attached to a sheet attachment interface of a positioning structure. The positioning structure is configured for substantially encompassing a cable circumference while in constraining configuration. In a pocket between the positioning structure and the cable contact sheet is filled a gel that provides a vibration dampening soft contact of the cable contact sheet with the cable insulation. The cushioning gel absorbs micro movement of the cable transferred onto the cable contact sheet such that wearing effects due to frictional sliding and vibration of the cable at its constraining location is substantially reduced. The positioning structure may be of rubber like material that is formed on its outside like a well known grommet.

The positioning structure may alternately be configured as a circumferentially tight able cable clip similar for example to a well known P-clamp. In such case, the positioning structure may include an outer rigid clamping structure that is attached at the outside of the rubber like material and that is combined on its inside with the cable contact sheet. The cable contact sheet may be of a woven fabric and/or of thin rubber like material. The cable contact sheet is sufficiently thin to absorb micro movement of the constrained cable well within its elastic range as is well known in the art. The underlying gel acts at the same time to provide sufficient contact pressure of the cable contact sheet with the cable circumference.

DETAILED DESCRIPTION

Figure 1:
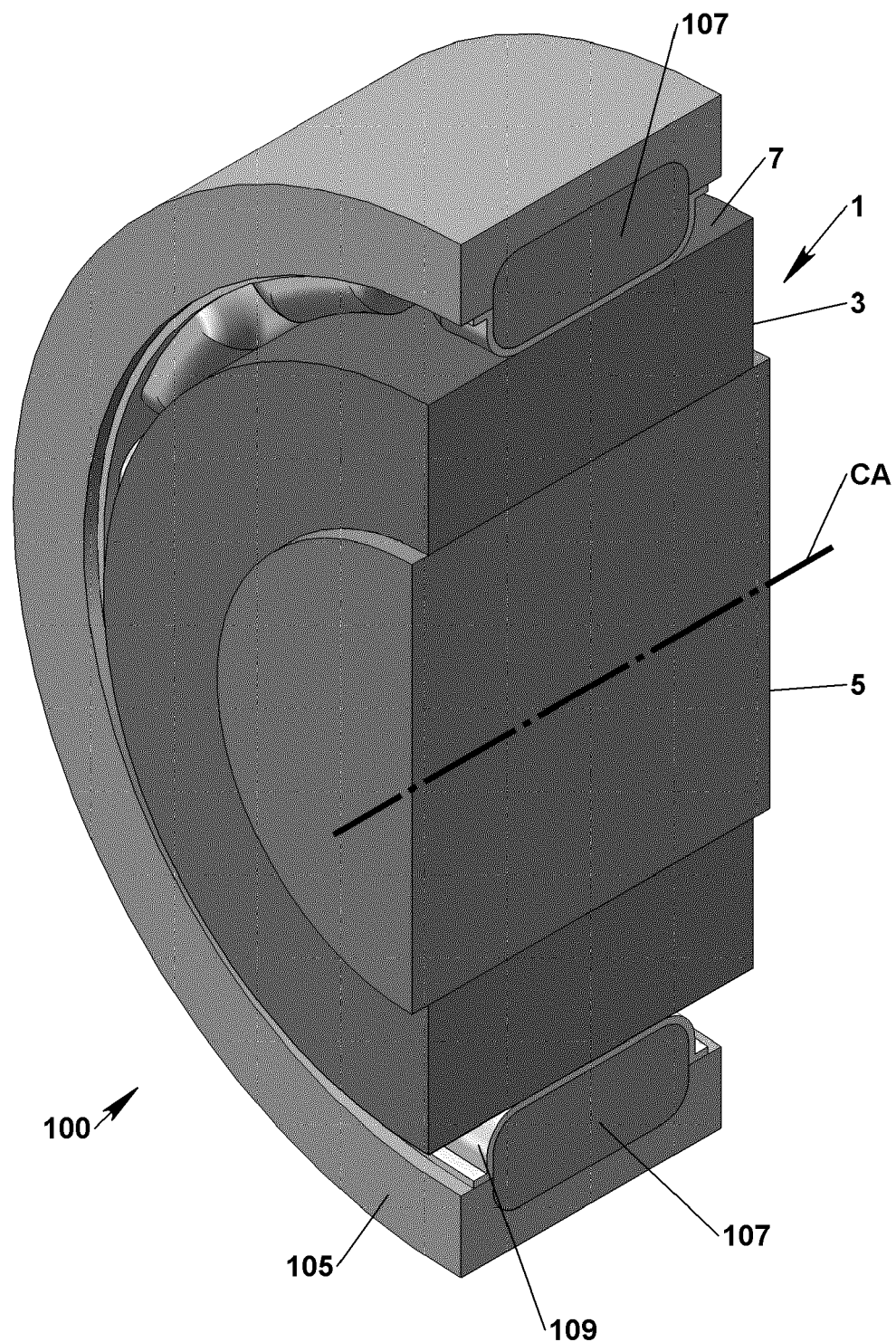
FIG. 1 is a first shaded perspective cut view of a cable portion constrained in a first embodiment of the invention. The cut plane is vertical and coinciding with cable axis CA.
Figure 2:
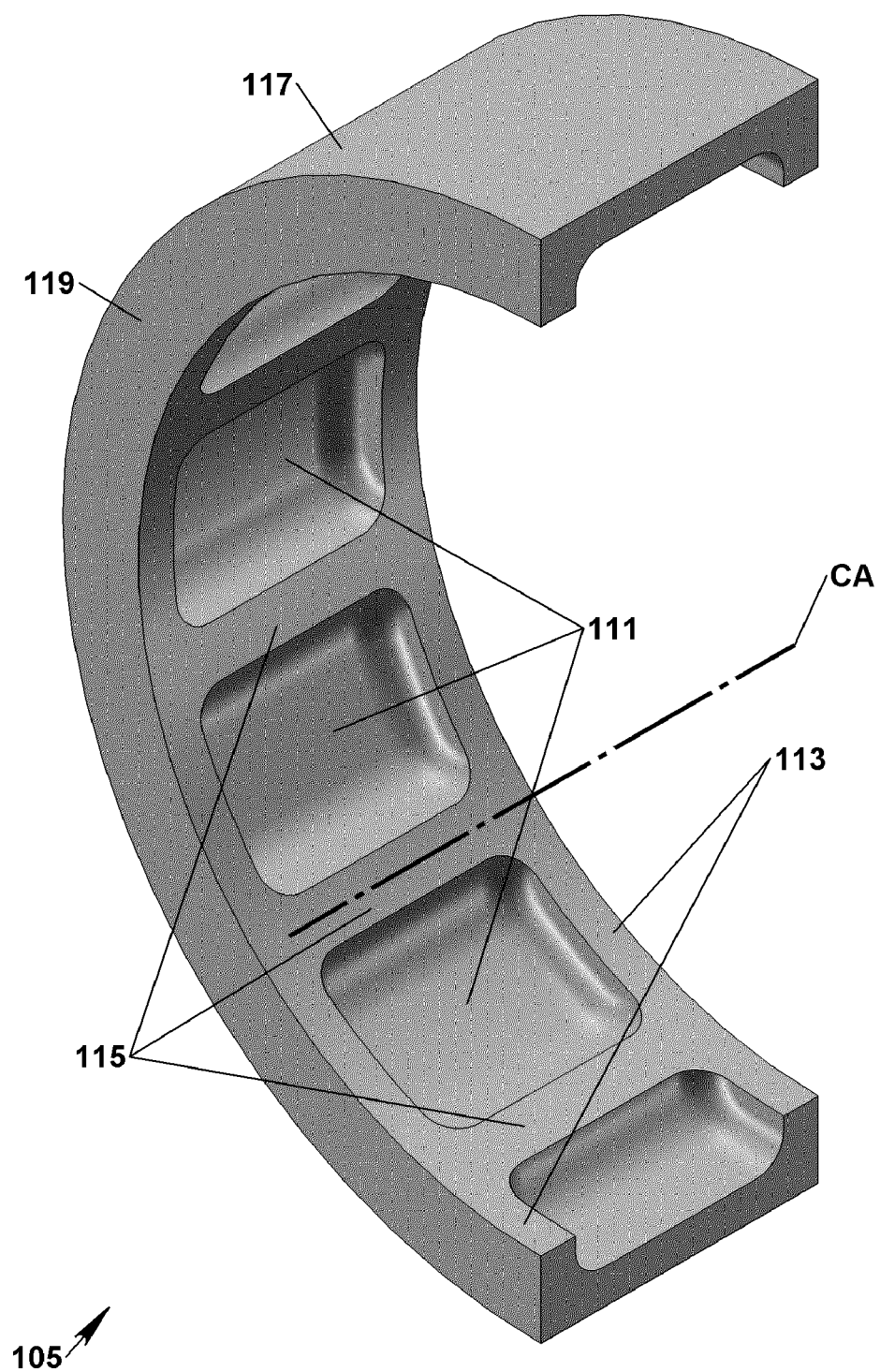
FIG. 2 is the first shaded perspective cut view of the positioning structure of FIG. 1.

Referring to FIG. 1, a prior art cable 1 may extend with its cable core 5 and cable insulation 3 along a cable axis CA. A cable circumference 7 may surround the cable axis CA. A cable constraining device 100 in accordance with a first embodiment of the invention may include a positioning structure 105, a flexible cable contact sheet 109 and a gel 107. Referring to FIG. 2, the positioning structure 105 may have a sheet attachment interface 113, 115 that is radially inward facing and substantially encompassing the cable circumference 7 while in a cable constraining configuration. The cable constraining configuration may be different from a fabrication configuration as explained in detail further below. Embedded in the sheet attachment interface may be one or more gel basins 111. Between the gel basins 111 may be a transverse seam 115 as a portion of the remaining sheet attachment interface 113, 115. Circumferential seams 113 are also portions of the sheet attachment interface 113, 115. The positioning structure 105 may feature an outer circumference 117 and axial faces 119 at both axial ends of it.

Figure 3:
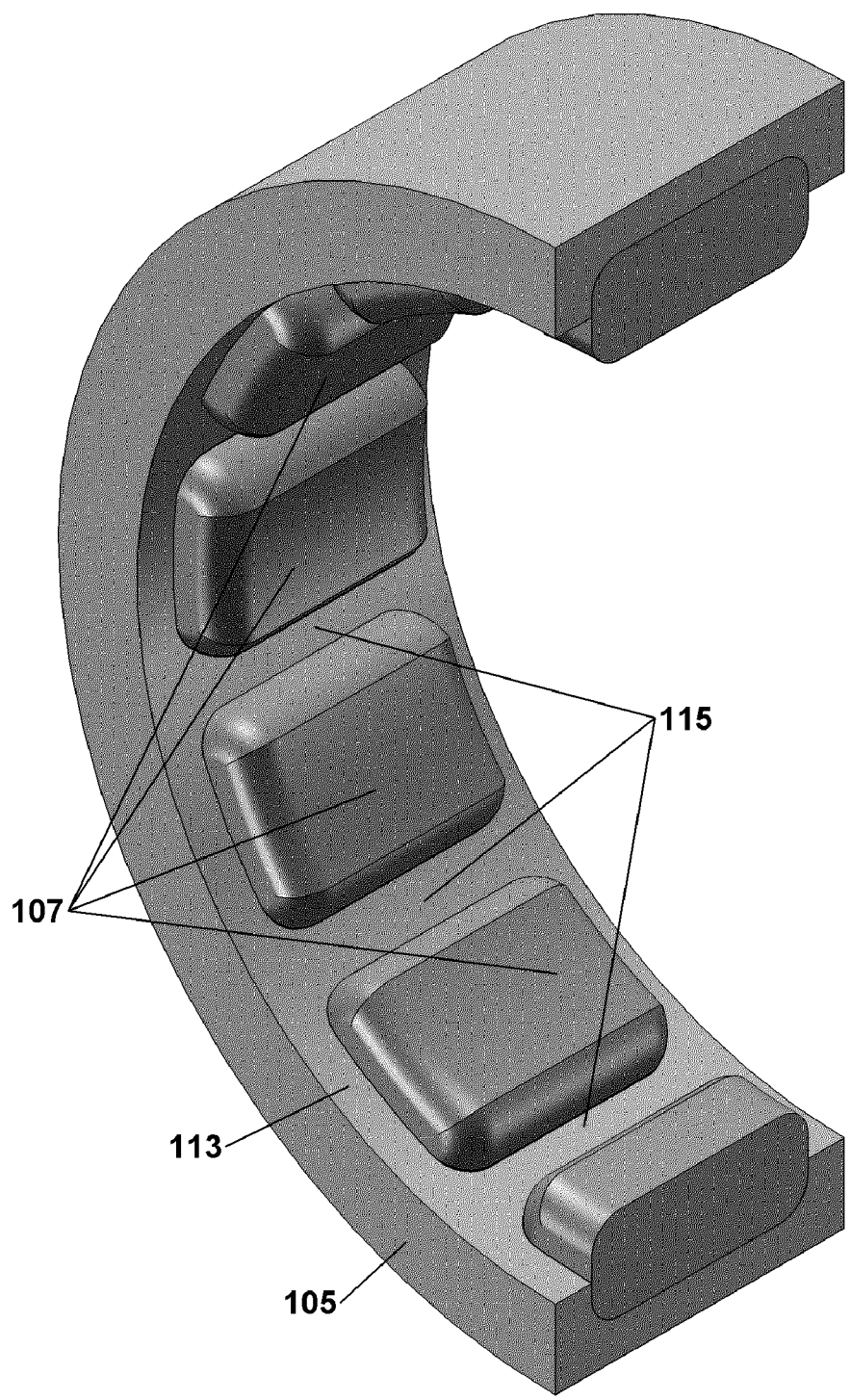
FIG. 3 is the first shaded perspective cut view of the positioning structure and gel of FIG. 1.
Figure 4:
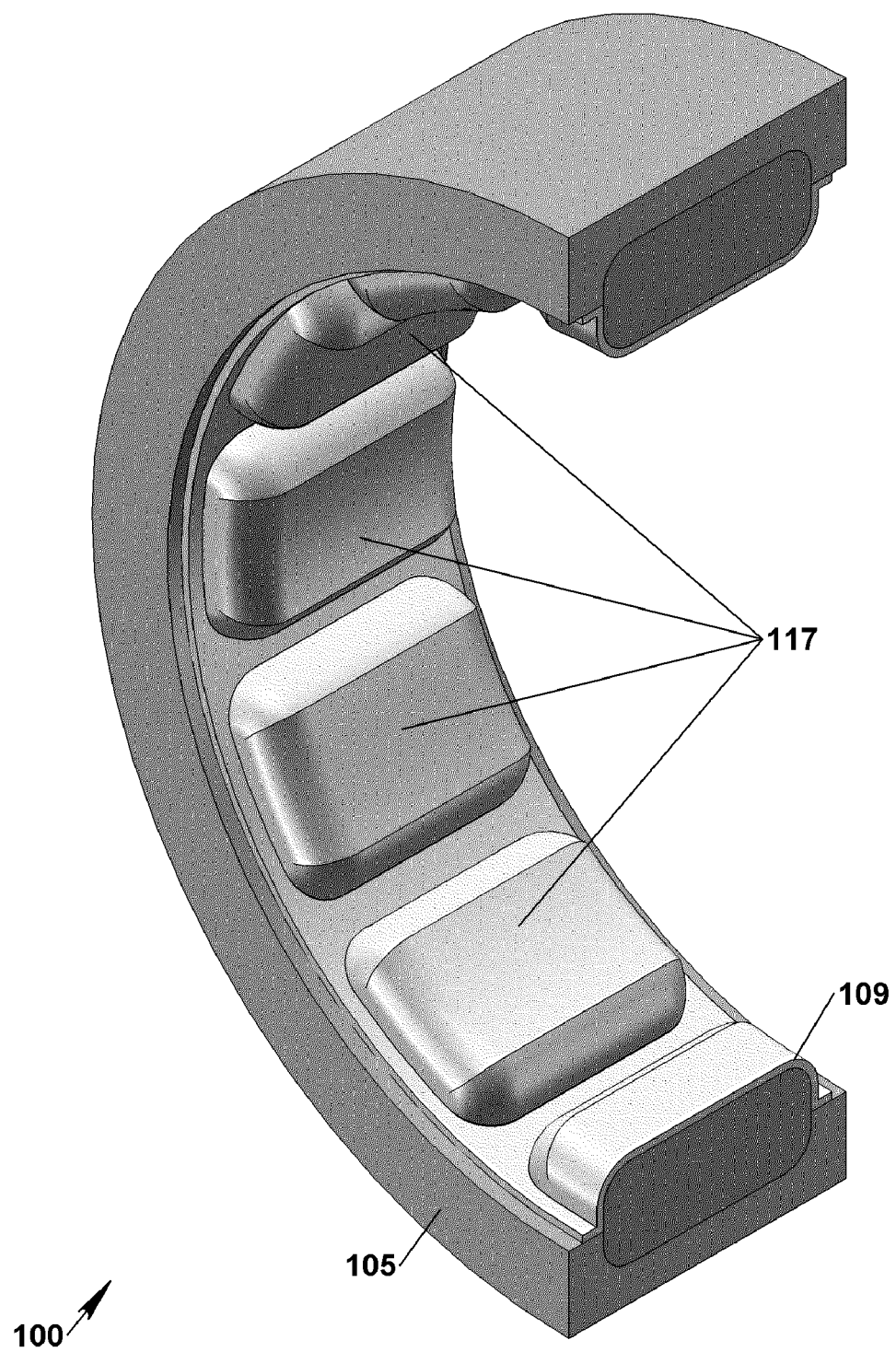
FIG. 4 is the first shaded perspective cut view of the positioning structure, gel and cable contact sheet of FIG. 1.
Figure 5:
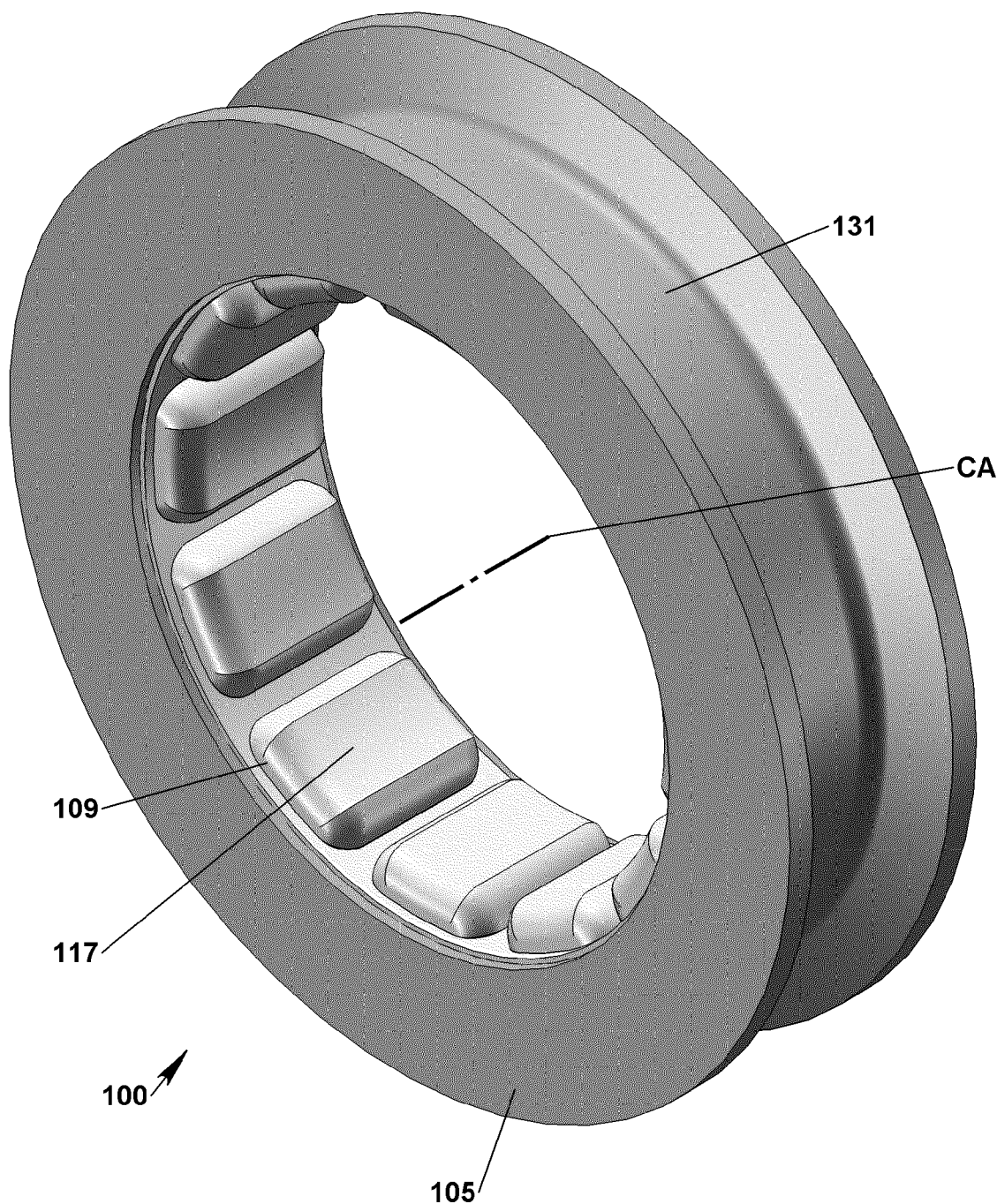
FIG. 5 is a second shaded perspective view of a second embodiment of the invention.

Referring to FIGS. 3 and 4, a flexible contact sheet 109 may be partially attached to the sheet attachment interface 113, 115 such that one or more pockets are defined in between the flexible contact sheet 109 and the sheet attachment interface 113, 115. In case of employed gel basin(s) 111, the pocket may be defined between the flexible contact sheet 109 and the respective gel basin 111. Separating the gel 107 into a number of small pockets may assist in avoiding long term creep and redistribution of the gel 107 as may be well appreciated by anyone skilled in the art. In the FIGS. 1-6, the transverse seams 115 are depicted as being substantially parallel with the cable axis CA particularly in a second embodiment in which the cable constraining configuration is the same as the fabrication configuration. In the second embodiment depicted in FIG. 5, the holding structure 105 may be configured on its outside similar to a well known grommet with an outside circumferential groove 131, which may be snapped into a clamping contour such as a mounting hole (not shown) as is well known in the art. The holding structure 105 may be initially fabricated in an injection molding process, followed by a second co-molding process where the gel 107 is applied. The flexible contact sheet 109 may be attached to the sheet attachment interface 113, 115 in a final fabrication stage. In case of the flexible contact sheet 109 being of rubber like material, it may be combined with the sheet attachment interface 113, 115 by a co-molding process as well. In case of the flexible contact sheet 109 including a fiber fabric material such as well known Kevlar™, the flexible contact sheet 109 may be glued or welded to the sheet attachment interface 113, 115. Due to the closed circular shape of the holding structure 105, the co-molding and other eventual fabrication steps are preferably performed in a direction substantially parallel to the cable axis CA. In the second embodiment, the holding structure 105 provides rough and static shape adjustment to the cable circumference 7 while the cushion(s) 117 defined by the gel 107 and the flexible contact sheet 109 provide balanced constraining pressure and dynamic damping of cable 1 thereby absorbing micro movement and vibration.

Figure 6:
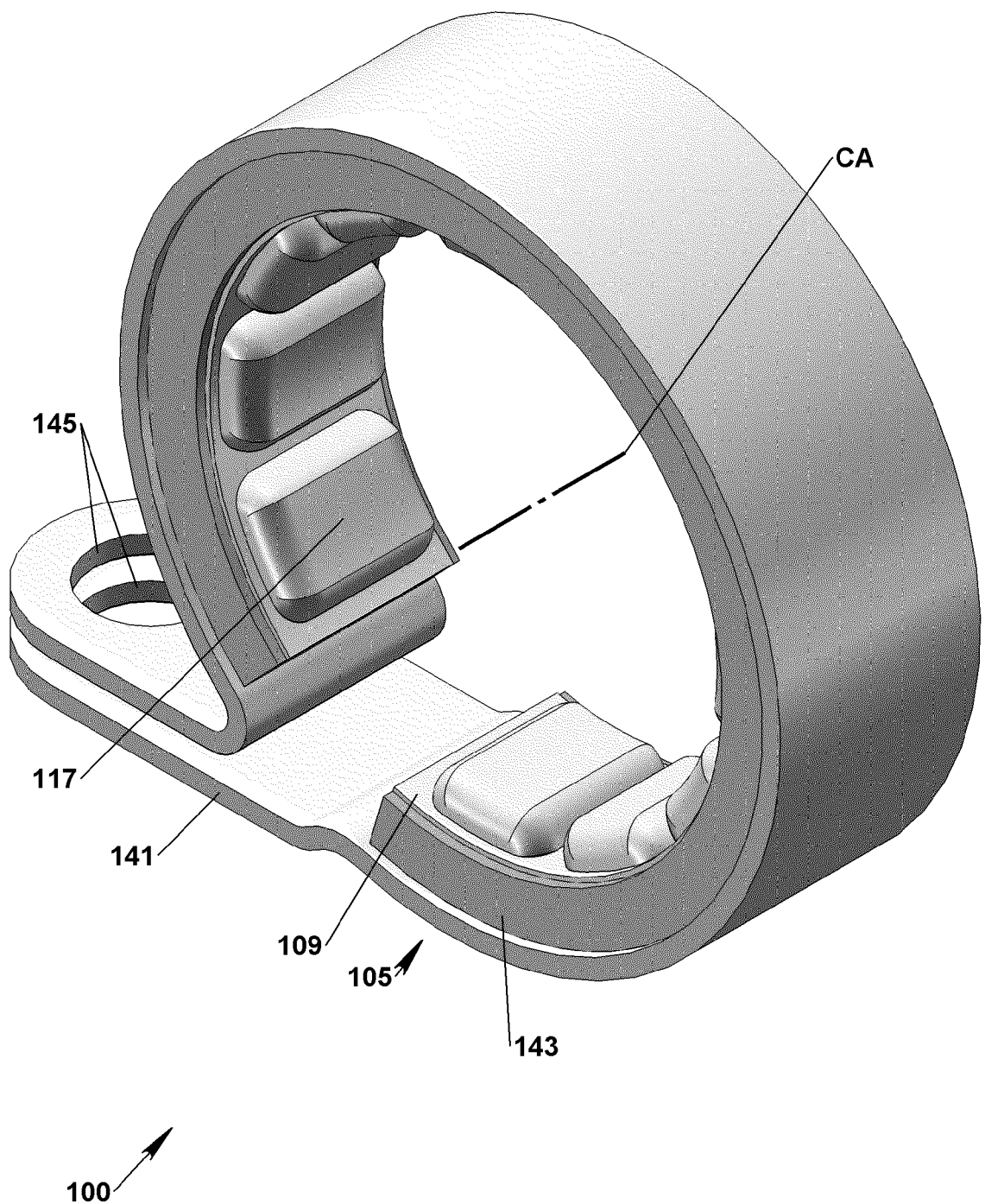
FIG. 6 is the second shaded perspective view of a third embodiment of the invention.

Referring to FIG. 6 and a third embodiment of the invention, the positioning structure 105 may be configured as a circumferentially tight able cable clip similar for example to a well known P-clamp. In that case, part of the holding structure 105 may be an outer rigid clamping structure 141 configured and acting for example as a well known P-clamp. The outer rigid clamping structure 141 may also be configured as other well known cable clamping structures that are either once or twice circumferentially separated to provide the circumferential tightening as is well known in the art. In the third embodiment, an intermediate rubbery structure 143 that is combined with the outer rigid clamping structure 141 is also part of the holding structure 105. In the third embodiment, the outer rigid clamping structure 141 provides on one hand positioning stiffness and clamping firmness of the cable 1 while the intermediate rubbery structure 143 provides rough and static shape adjustment to the cable circumference 7 while the cushion(s) 117 defined by the gel 107 and the flexible contact sheet 109 provide balanced constraining pressure and dynamic damping of cable 1 thereby absorbing micro movement and vibration. The outer rigid clamping structure 141 may have an attachment feature(s) 145 such as a well known screw hole 145 via which the cable constraining device 100 may be attached and circumferentially tightened.

In the third embodiment, the positioning structure 105 may be circumferentially discontinuous as shown in FIG. 6. Particularly in such case, the fabrication configuration of the holding structure 105 and/or the intermediate rubbery structure 143 may be straightened compared to its constraining configuration as depicted in the FIGS. 1-6. A straightened fabrication configuration in turn may provide more perpendicular access to the sheet attachment interface 113, 115, which gives more free fabrication access to the transverse seam(s) 115 and circumferential seams 113 as may be well appreciated by anyone skilled in the art. Consequently, the transverse seam(s) 115 may be in a substantial angle with respect to the cable axis CA, which may reduce eventual long term setting of the cable 1 in between two adjacent gel cushions 117. Also, the flexible contact sheet 109 may easily be accessed for gluing, stitching, welding or co-molding to the sheet attachment interface 113, 115. The final fabrication profile of the positioning structure 105 and/or intermediate rubbery structure 143, the flexible contact sheet 109 and the gel 107 may be lengthened in conjunction with and attached inside any prefabricated cable 1 clamping contour in general and the outer rigid clamping structure 141 in particular. A cable 1 clamping contour may be for example a through hole.

In all embodiments, the flexible contact sheet 109 may be of a rubber like material and/or a fiber fabric that may be woven and/or coated. The coating may also be rubber like material and/or a well known stiction coating to increase well known stiction between the flexible contact sheet 109 and the cable circumference 7. Increasing such stiction in the interface between cable circumference 7 and flexible contact sheet 109 may also reduce friction wear there. Use of the cable constraining device 100 is similar to conventional well known grommets and cable clips.

Accordingly, the scope of the invention described in the Specification above and the Figures is set forth by the following claims and their legal equivalent:

What is claimed is:

1. A cable constraining device comprising:
   a. a positioning structure comprising a sheet attachment interface that is radially inward facing and substantially encompassing a circumference of said cable while in a cable constraining configuration, said sheet attachment interface comprising:
      i. circumferential seams;
      ii. a number of transverse seams;
   b. a flexible contact sheet attached to said circumferential seams and said number of transverse seams such that a number of pockets is defined in between said flexible contact sheet and said sheet attachment interface; and
   c. a gel filling said number of pockets.

2. The cable constraining device of claim 1, wherein said positioning structure is configured as a grommet comprising an outside circumferential groove.

3. The cable constraining device of claim 1, wherein said positioning structure is configured as a circumferentially tight able cable clip comprising an outer rigid clamping structure.

4. The cable constraining device of claim 3, wherein said sheet attachment interface is provided by an intermediate rubbery structure combined with said outer rigid clamping structure.

5. The cable constraining device of claim 3, wherein said outer rigid clamping structure is a P-clamp.

6. The cable constraining device of claim 3, wherein said outer rigid clamping structure further comprises an attachment feature.

7. The cable constraining device of claim 1, wherein said positioning structure is of rubber like material.

8. The cable constraining device of claim 1, wherein said pocket is partially provided by a gel pocket that is embedded in said sheet attachment interface.

9. The cable constraining device of claim 1, wherein said flexible cable contact sheet includes a fiber fabric.

10. The cable constraining device of claim 9, wherein said fiber fabric is coated with a rubber like material.

11. The cable constraining device of claim 9, wherein said fiber fabric is coated with a stiction increasing material.

12. The cable constraining device of claim 1, wherein said flexible cable contact sheet is of a rubber like material.

13. The cable constraining device of claim 1, wherein a transverse seam of said sheet attachment interface is in a substantial angle with respect to a cable axis of said cable.

14. The cable constraining device of claim 1, wherein said flexible cable contact sheet is glue attached to said sheet attachment interface.

15. The cable constraining device of claim 1, wherein said flexible cable contact sheet is co-molded to said sheet attachment interface.

16. The cable constraining device of claim 1, wherein said flexible cable contact sheet is stitch attached to said sheet attachment interface.

17. The cable constraining device of claim 1, wherein said flexible cable contact sheet is weld attached to said sheet attachment interface.

* * * * *